Figure 1:
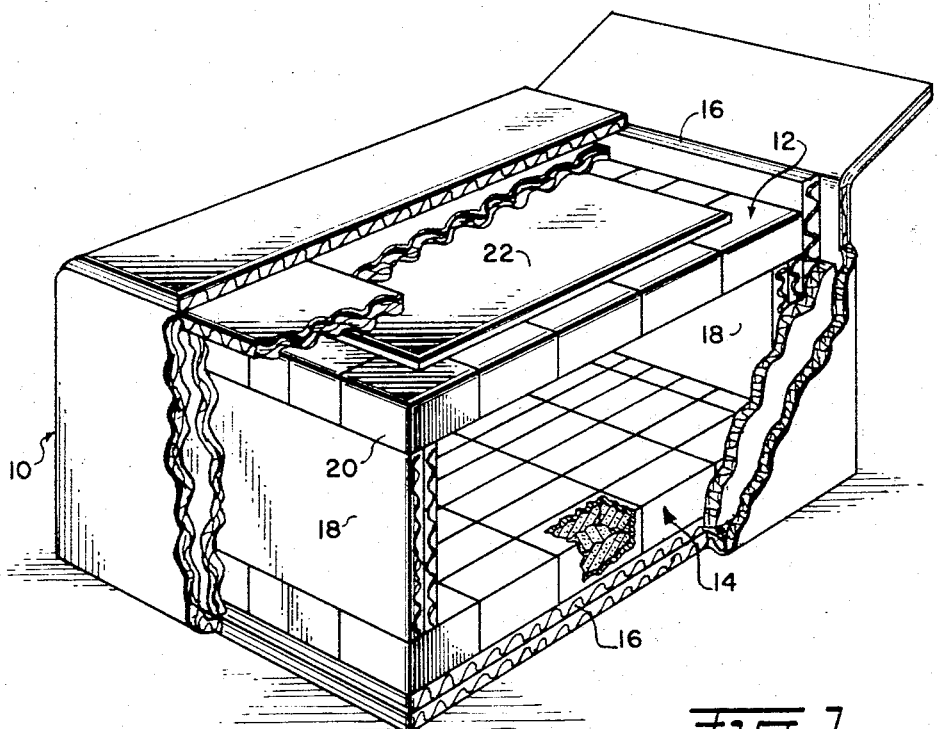

June 27, 1961 M. TELKES 2,989,856
TEMPERATURE STABILIZED CONTAINER AND MATERIALS THEREFOR
Filed April 8, 1957

INVENTOR.
MARIA TELKES
BY
John J. McGlew
ATTORNEY

United States Patent Office

2,989,856
Patented June 27, 1961

2,989,856
TEMPERATURE STABILIZED CONTAINER AND MATERIALS THEREFOR
Maria Telkes, 389 Terhune Road, New York, N.Y.
Filed Apr. 8, 1957, Ser. No. 651,212
4 Claims. (Cl. 62—371)

This invention relates in general to a temperature stabilized container and to temperature stabilizing materials, and particularly to an improved container for maintaining articles packed therein within a specified range of temperatures, and to temperature stabilizing materials which will absorb and release heat at constant temperatures whereby to maintain a space at a given temperature or temperature range when the outside thereof is exposed to much higher or lower temperatures.

In many instances it is desirable to maintain a space or a container within a predetermined temperature range for several hours. For example, ice is used to keep food and vegetables or the like at temperatures at which they will not spoil. There are many additional materials such as pharmaceuticals, yeast, chocolate candy and the like which must be maintained at somewhat higher temperatures than ice, and the maintenance of these temperatures cannot be easily accomplished by the use of ice as a coolant. Some materials such as vaccine cultures for example, must be maintained within a narrow temperature range above 90° F. during shipment which may last for as long as 72 hours.

This invention is concerned with providing materials which will either absorb or liberate in the neighborhood of 100 B.t.u.'s per pound of heat from or to the surrounding space at definite transition temperatures, and further to the combination of these materials in a package to maintain articles packed therein within desired temperature ranges. It has been discovered that there are several salt hydrates which melt in the range of between 40° and 75° F. and have heat of fusion values of around 100 B.t.u.'s per pound and densities of around 90 to 100 pounds per cubic foot. Many of these salt hydrates will give the same amount of refrigeration per unit of volume as ice occupying the same volume. In accordance with the invention there is provided an arrangement of these materials in a container to effect maintaining the container within the desired temperature ranges of various articles to be packed therein.

In accordance with one aspect of the invention there is provided a material which will have particular application in maintaining a space at 40° F. for long periods of time. This material may be repeatedly recycled, i.e. when the material is initially below 40° F. it may be subjected to temperatures above 40° F. which will eventually cause it to change state and cool the surrounding space upon reaching 40° F., and thereafter it may be cooled below 40° F. to recharge it for subsequent heat absorption at 40° F. A reverse cycle is used when it is necessary to heat the surrounding space, e.g. maintaining a container at 40° F. when the expected ambient is below 40° F. In the latter case, the material gives up its latent heat of transition when brought down to 40° F. from a higher initial temperature. Thus, this 40° F. heat storage material may be used to either heat or cool a surrounding space depending on its initial temperature.

In accordance with another aspect of this invention a material is provided which will have particular application in maintaining a space at 52° F. In accordance with still another aspect there is provided a material which will maintain a space at 64° F. In accordance with still another aspect of the invention a material is provided which will maintain a space at 70° F. In accordance with another aspect of the invention a material is provided which will maintain a space at 75° F. All of these materials, upon going through their transition temperatures, will give up in the neighborhood of 100 B.t.u.'s per pound of heat to the surrounding area when subjected to temperatures below those temperatures mentioned, and will absorb heat in similar amounts when subjected to temperatures above those mentioned.

Accordingly, it is an object of this invention to provide a container which will maintain materials packaged therein at predetermined temperatures.

Accordingly, it is an object of this invention to provide a container for packaging materials which will be maintained between the temperature range of from 40° to 75° F., or any predetermined range between 40° to 75° F.

A further object of this invention is to provide an economical temperature stabilizing material.

The various features of novelty which characterize the invention are pointed out with particularity in the claims anexed to and forming a part of this specification. For a better understanding of the invention, its operating advantages and specific objects obtained by its use, reference should be had to the accompanying drawings and descriptive matter in which there is illustrated and described a preferred embodiment of the invention.

Figure 2:
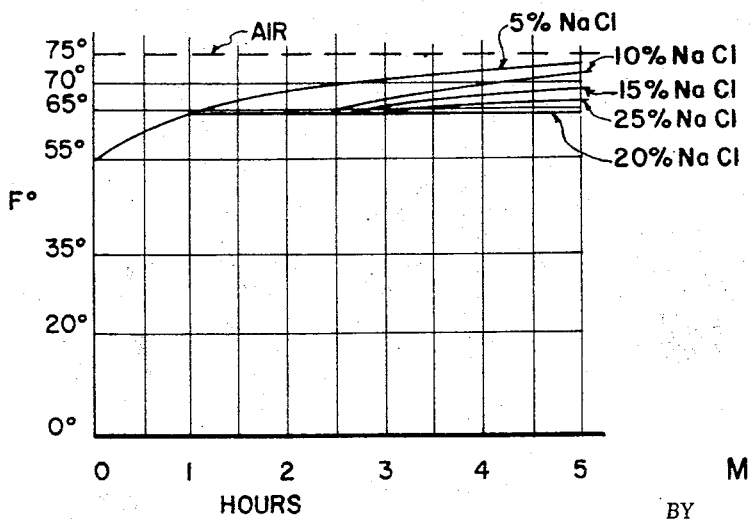

In the drawings:

FIGURE 1 is a perspective view partly broken away of a container constructed in accordance with this invention and having heat storage materials arranged therein; and FIGURE 2 is a curve showing the desired percentages of materials to form a heat stabilizing material at 64° F.

Referring to the drawings in particular, the invention as embodied therein (FIGURE 1) includes a container generally designated 10 having heat storage materials arranged therein in an upper grid 12 and a lower grid 14. While the heat storage materials are in this instance arranged in the upper and lower grids 12 and 14 they may be placed in any location including the walls of the container. The container 10 is preferably made of a light weight material having good insulating qualities such as corrugated paperboard. To provide additional insulation, additional packing materials such as plastic foam, or the like, or in this instance corrugated board panels 16 are placed adjacent each of the inside walls of the container. The upper grid 12 and the lower grid 14 of heat storage materials are held in spaced relationship inside the container by corrugated side packing strips 18, 18.

In accordance with the invention, the grids 12 and 14 comprise a plurality of generally rectangular blocks 20 of a light weight material such as aluminum or even a plastic, each of which is filled with a heat storage chemical. The blocks may also be a porous member such as balsa wood, foam plastic, expanded mica, etc., which has absorbed a considerable quantity of heat storage material into its pores. In this instance the blocks are held together as by welding or heat sealing to a light weight plate 22. The plate 22 may be highly polished or provided with a reflective top coating to add insulating qualities. The material to be packaged in the container 10 is placed between the upper grid 12 and the lower grid 14 between the side packing pieces 18. The packaged material will be maintained within predetermined temperature limits by including heat-storage materials in the rectangular blocks 20, which will liberate or absorb an amount of heat sufficient to maintain the interior of the container within the temperature limits for the expected time and the expected temperatures.

A heat storage chemical which, when placed in sufficient quantities in the rectangular blocks 20, will maintain, for long periods, articles packaged in the container 10 at 40° F. comprises: a mixture of sodium sulfate decahydrate, sodium chloride and potassium chloride. It has been found that the transition temperature of a proper mixture of sodium sulfate decahydrate ($Na_2SO_4 \cdot 10H_2O$) and sodium chloride (NaCl) and potassium chloride (KCl) is 40° F. Other temperature levels of transition can be obtained by changing the proportions of the mixture. The mixture giving the desired 40° F. temperature of transition comprises the following:

| Material | Weight | Pounds or Grams |
| --- | --- | --- |
| $Na_2SO_4$ | 31 | 77.5 |
| NaCl | 13 | 32.5 |
| KCl | 16 | 40 |
| Water | 40 | 100 |
| Total | 100 | 250 |

It should be appreciated that the 40° F. transition temperature material mentioned supra will either liberate or absorb approximately 100 B.t.u. per pound of material. Therefore, the container 10 should be designed for inclusion of sufficient insulation to maintain the packed contents within the temperature limits expected for the time of shipment and air temperatures expected to be encountered.

A heat storage material which when placed in the rectangular blocks 20 will maintain articles packaged in the container 10 at 64° F. (18° C.) is sodium sulfate decahydrate ($Na_2SO_4 \cdot 10H_2O$) mixed with sodium chloride (NaCl).

The preferred mixture of sodium sulfate decahydrate with sodium chloride was obtained by experiment, in which various percentages of sodium chloride were added to the sodium sulfate decahydrate in an uninsulated container holding a total of 0.30 pound of the salt mixture. The container was sealed, cooled to 55° F. and then kept in an ambient air temperature of 75° F. while the temperature of the mixture inside the container was recorded as shown in FIGURE 2 of the drawings. FIGURE 2 shows the temperatures of various mixtures over the course of five hours when exposed to a 75° F. ambient. By referring to FIGURE 2 it is seen that mixtures containing from 5 to 10% of sodium chloride tended to rapidly increase in temperature after an hour or so, while mixtures containing from 15 to 25% sodium chloride maintained practically the same temperature without insulation for over four hours. Of course, this temperature may be maintained for much longer periods when insulation is used to cover the container. The mixture tending to maintain the 64° F. transition temperature longest contained approximately 17% sodium chloride based on weight in respect to the total mixture. This mixture can be made from anhydrous sodium sulfate by adding common table salt and water. Since ordinary sodium sulfate decahydrate tends to lose water and is more expensive than anhydrous sodium sulfate, it has been found preferable to use anhydrous sodium sulfate and add water in the correct percentages to obtain the desired mixture. The preferred salt mixture for a transition temperature of 64° F. is as follows:

| Material | Weight in Percent | Pounds or Grams |
| --- | --- | --- |
| Sodium sulfate $Na_2SO_4$ (anhydrous) | 37 | 80 |
| NaCl | 17 | 37 |
| Water | 46 | 100 |
| Total | 100 | 217 |

It is possible to decrease the transition temperature of the sodium sulfate decahydrate and sodium chloride mixture from 64° F. to as low as 52° F. by adding ammonium chloride ($NH_4Cl$). This can be done degree by degree, depending on the amount of $NH_4Cl$ added. To attain 52° F., the mixture contains about 74% sodium sulfate decahydrate ($Na_2SO_4 \cdot 10H_2O$) with 14% sodium chloride (NaCl) and 12% ammonium chloride ($NH_4Cl$). For intermediate temperatures from below 64° F. to 52° F. the amount of sodium sulfate decahydrate is increased and ammonium chloride is decreased. For reasons of economy and simplicity, anhydrous sodium sulfate is used. (Sodium sulfate decahydrate contains 44% sodium sulfate and 56% water.) The proportions for 52° F. mixture are:

| Materials | Weight in Percent | Pounds or Grams |
| --- | --- | --- |
| Sodium sulfate $Na_2SO_4$ (anhydrous) | 32 | 76 |
| Sodium chloride NaCl | 14 | 33.5 |
| Ammonium chloride $NH_4Cl$ | 12 | 28.5 |
| Water | 42 | 100 |
| Total | 100 | 238 |

In some instances it may be desirable to add a material such as a thin layer of mineral oil to the interiors of containers containing ammonium chloride mixed with the other salts. This oil will not effect the transition temperature but will prevent crystallization of ammonium chloride in such a way that the crystals will creep up on the walls of the container.

Various percentages of sodium sulfate ($Na_2SO_4$), magnesium sulfate ($MgSO_4$) and water when mixed together can result in transition temperatures between 70° to 75° F. By adding small amounts of sodium chloride (NaCl) to mixtures of sodium sulfate and magnesium sulfate and water, transition temperatures below 70° F. can be obtained. Some mixtures which will result in transition temperatures between 70° and 75° F. are indicated in the following table. It is to be noted in this connection that variations in percentages of the materials included in the mixtures will result in variations in the transition temperatures of the resultant mixture, in the range of from 70° to 75° F. Some preferred mixtures in this range are as follows:

| Materials | Mixtures (Weight in percent) | | |
| --- | --- | --- | --- |
| | A | B | C |
| 1. Based on Anhydrous $MgSO_4$: | | | |
| Sodium sulfate $Na_2SO_4$ | 25 | 21 | 19 |
| Magnesium sulfate $MgSO_4$ | 21 | 19 | 17 |
| Water | 54 | 60 | 64 |
| 2. Using $MgSO_4 \cdot 7H_2O$: | | | |
| Sodium sulfate $Na_2SO_4$ | 25 | 21 | 19 |
| Magnesium sulfate heptahydrate $MgSO_4 \cdot 7H_2O$ | 43.5 | 38 | 34 |
| Water | 31.5 | 41 | 47 |

In connection with the above table it should be noted that addition of up to 20% sodium chloride will reduce the transition temperature from the 70° to 75° F. range down to as low as 60° F. depending on the amount of sodium chloride added.

Thus the invention provides both a container and heat storage materials for keeping articles at a certain temperature or within a certain temperature range. In order to package articles in the container 10 for shipment or storage when it is expected that the air temperature to which the container will be exposed would be below the desired temperature to be maintained only one heat storage mixture is included in the blocks 20 of both the upper grid 12 and the lower grid 14. A heat storage mixture should be chosen which will give up latent heat at a temperature a few degrees above the lowest desired temperature so that the mixture will add heat to the container whenever the inside of the container approaches this lowest desired temperature.

When it is expected that the container will be subjected to a wide range of air temperatures it is desirable to pack more than one kind of chemical storage material in the blocks 20. For example, if it were desirable to maintain articles within a temperature range of from 40° to 52° F. it would be preferred to fill the blocks 20 of the upper grid 12 with sodium sulfate decahydrate, sodium chloride, and ammonium chloride mixture in a proportion specified previously to give a transition temperature of 52° F. A material having a transition temperature of 40° F. may be preferably placed in the blocks 20 of the lower grid 14. Such a material is sodium sulfate decahydrate, sodium chloride, and potassium chloride mixed in the percentages described previously. Thus when the space in the container 10 between the upper grid 12 and the lower grid 14 tended to heat to a temperature above 52° F. the material in the upper grid 12 would absorb heat from the surrounding space and keep the package cool below the 52° F. upper limit. Likewise if the outside air was below 40° F. the heat storage chemical packaged in the lower grid 14 would heat the interior of the container when the temperature inside approached 40° F. and thereby keep the article packaged therein above 40° F.

It is of course to be realized that the materials in the blocks 20 of either the upper grid 12 or the lower grid 14 may be alternately arranged with a 40° F. transition temperature material and a 52° F. transition temperature material or any other transition heat storage material and any combination of arrangement of blocks containing various heat storage materials may be made in either the upper or lower grid to achieve the desired temperature results inside the container 10. Thus it may be seen that the invention provides an exteremely fast and economical way for packaging materials which require shipment within a given temperature range.

From the foregoing it will be understood that the methods and apparatus embodying the present invention described above are well suited to provide the advantages set forth, and since many possible embodiments may be made of the various features of this invention and as the apparatus herein described may be varied in various parts, all without departing from the scope of the invention, it is to be understood that all matter hereinbefore set forth as shown in the accompanying drawings is to be interpreted as illustrative and that in certain instances, some of the features of the invention may be used without a corresponding use of other features, all without departing from the scope of the invention.

What is claimed is:

1. A device for keeping articles packaged therein within a predetermined temperature range which comprises a container, heat storage material stored within said container which gives up a considerable amount of heat upon being cooled below a temperature close to the lowest temperature of said predetermined temperature range and another heat storage material stored within said container which absorbs a considerable amount of heat upon being heated above a temperature close to the highest temperature of said predetermined temperature range, said heat storage materials being arranged in grids within said container, one of said grids being positioned near the top of said container and another of said grids being positioned near the bottom of said container.

2. A device for keeping articles packaged therein within a predetermined temperature range which comprises a container, a heat storage material stored within said container which gives up a considerable amount of heat upon being cooled below a temperature close to the lowest temperature of said predetermined temperature range and a heat storage material stored within said container which absorbs a considerable amount of heat upon being heated above a temperature close to the highest temperature of said predetermined temperature range, said heat storage materials being arranged in the walls of said container.

3. A device for keeping articles packaged therein within a predetermined temperature range which comprises a container, a heat storage material confined within said container which gives up a considerable amount of heat upon being cooled below a temperature of 40°, and a heat storage material confined within said container which absorbs a considerable amount of heat upon being heated above a temperature of 75° F. whereby the temperature within said container is maintained within a predetermined temperature range of 40° to 75° F.

4. A device for keeping articles packaged therein within a predetermined temperature range which comprises a container and heat storage materials confined therein, said heat storage material consisting of materials selected from the following group; a mixture consisting essentially of sodium sulfate decahydrate and from between 15% and 25% sodium chloride by weight, a mixture consisting of 74% sodium sulfate decahydrate and including approximately 14% sodium chloride and 12% ammonium chloride by weight, a mixture consisting essentially of sodium sulfate decahydrate and including approximately 13% sodium chloride and 16% potassium chloride, and a mixture consisting essentially of 25% sodium sulfate, 21% magnesium sulfate and the balance water, whereby said heat storage material maintains the temperature within said container within a predetermined temperature range.

References Cited in the file of this patent

UNITED STATES PATENTS

| | | |
|---|---|---|
| 1,786,842 | Hannach | Dec. 30, 1930 |
| 2,039,736 | Munters et al. | May 5, 1936 |
| 2,550,277 | Lhermitte et al. | Apr. 24, 1951 |
| 2,585,360 | Williams | Feb. 12, 1952 |
| 2,677,243 | Telkes | May 4, 1954 |
| 2,677,664 | Telkes | May 4, 1954 |
| 2,781,643 | Fairweather | Feb. 19, 1957 |

FOREIGN PATENTS

| | | |
|---|---|---|
| 912,173 | France | Aug. 1, 1946 |

UNITED STATES PATENT OFFICE
CERTIFICATE OF CORRECTION

Patent No. 2,989,856                      June 27, 1961

Maria Telkes

It is hereby certified that error appears in the above numbered patent requiring correction and that the said Letters Patent should read as corrected below.

In the heading to the printed specification, line 4, for "Maria Telkes, 389 Terhune Road, New York, N. Y., read -- Maria Telkes, New York, N. Y. (389 Terhune Road, Princeton, N. J.) --.

Signed and sealed this 7th day of November 1961.

(SEAL)
Attest:

ERNEST W. SWIDER
Attesting Officer

DAVID L. LADD
Commissioner of Patents
USCOMM-DC